(12) United States Patent
Watford et al.

(10) Patent No.: US 10,124,454 B2
(45) Date of Patent: Nov. 13, 2018

(54) OSCILLATING THRUST BEARING

(71) Applicant: Apex Brands, Inc., Apex, NC (US)

(72) Inventors: Jeremy Dean Watford, Irmo, SC (US); Edward Alan Harris, Columbia, SC (US)

(73) Assignee: APEX BRANDS, INC., Apex, NC (US)

( * ) Notice: Subject to any disclaimer, the term of this patent is extended or adjusted under 35 U.S.C. 154(b) by 493 days.

(21) Appl. No.: 14/990,191

(22) Filed: Jan. 7, 2016

(65) Prior Publication Data

US 2017/0136591 A1 May 18, 2017

Related U.S. Application Data

(60) Provisional application No. 62/255,791, filed on Nov. 16, 2015.

(51) Int. Cl.
*B23Q 5/32* (2006.01)
*B23B 39/10* (2006.01)
*B23Q 5/027* (2006.01)

(52) U.S. Cl.
CPC ............... *B23Q 5/32* (2013.01); *B23B 39/10* (2013.01); *B23Q 5/027* (2013.01); *B23Q 5/326* (2013.01); *B23B 2260/07* (2013.01); *B23Q 2705/06* (2013.01)

(58) Field of Classification Search
CPC .......... B23Q 5/32; B23Q 5/027; B23Q 5/326; B23Q 2705/06; B23B 39/10; B23B 2260/07
USPC ...................................................... 173/175
See application file for complete search history.

(56) References Cited

U.S. PATENT DOCUMENTS

| 1,925,289 | A | 9/1933 | Strobel |
| 2,514,759 | A | 7/1950 | Hallden |
| 3,363,700 | A | 1/1968 | Bogusch, Jr. |
| 5,073,068 | A | 12/1991 | Jinkins et al. |
| 7,048,077 | B2 | 5/2006 | Veres |

(Continued)

FOREIGN PATENT DOCUMENTS

| DE | 4026264 A1 | 2/1992 |
| DE | 202005008630 U1 | 9/2005 |

(Continued)

OTHER PUBLICATIONS

Drill Chip Breaker, Internet article, www.commandermultidrill.com, all enclosed pages cited.

(Continued)

*Primary Examiner* — Michelle Lopez
(74) *Attorney, Agent, or Firm* — McNair Law Firm, P.A.

(57) ABSTRACT

A positive feed tool may include a motor, a gear head and a spindle. The gear head may be operably coupled to the motor and may include a drive assembly and a feed assembly. The spindle may be operably coupled to the gear head and may be selectively driven rotationally and fed axially based on operation of the drive assembly and the feed assembly, respectively. The feed assembly may include a feed rate oscillator having a fixed cam and a movable cam operably coupled to each other via a plurality of rolling elements to oscillate between a maximum width and a minimum width of the feed rate oscillator based on a position of the movable cam. The rolling elements alternate between a first state in which at least some of the rolling elements are unloaded and a second state in which all of the rolling elements are loaded.

20 Claims, 5 Drawing Sheets

(56) References Cited

U.S. PATENT DOCUMENTS

| | | |
|---|---|---|
| 7,587,965 B2 | 9/2009 | Mann et al. |
| 7,882,901 B2 | 2/2011 | Veres |
| 8,469,641 B2 | 6/2013 | Jaillon |
| 8,696,265 B2 | 4/2014 | Elsmark et al. |
| 8,721,232 B2 | 5/2014 | Peigne |
| 2006/0251480 A1 | 11/2006 | Mann et al. |
| 2007/0209813 A1 | 9/2007 | Veres |
| 2009/0074525 A1 | 3/2009 | Jaillon |
| 2010/0003096 A1 | 1/2010 | Peigne |
| 2013/0051946 A1 | 2/2013 | Peigne |
| 2014/0238711 A1 | 8/2014 | Myhill |

FOREIGN PATENT DOCUMENTS

| | | |
|---|---|---|
| DE | 102005002462 A1 | 7/2006 |
| EP | 1500780 A1 | 1/2005 |
| EP | 2052809 A1 | 4/2009 |
| EP | 2032294 B1 | 9/2010 |
| EP | 1916045 B1 | 4/2013 |
| EP | 2501518 B1 | 10/2013 |
| FR | 2952563 A1 | 5/2011 |
| GB | 1212475 | 11/1970 |
| JP | H03136710 A | 6/1991 |
| WO | 2008000935 A1 | 1/2008 |
| WO | 2013088343 A1 | 6/2013 |
| WO | 2014064047 A1 | 5/2014 |

OTHER PUBLICATIONS

International Search Report and Written Opinion of corresponding PCT application No. PCT/US2016/061753 dated Feb. 23, 2017, all enclosed pages cited.

OSCILLATING THRUST BEARING

CROSS REFERENCE TO RELATED APPLICATIONS

The present application claims priority to U.S. patent application No. 62/255,791 filed Nov. 16, 2015, which is expressly incorporated by reference in its entirety.

TECHNICAL FIELD

Example embodiments generally relate to power tools and, in particular, relate to positive feed tools that employ feed rate oscillation.

BACKGROUND

Power tools are commonly used across all aspects of industry and in the homes of consumers. Power tools are employed for multiple applications including, for example, drilling, tightening, sanding, and/or the like. For some drilling and fastening operations, positive feed tools may be preferred. Positive feed tools are often used to perform operations on workpieces such as steel, aluminum, titanium and composites, and may employ a tool feeding mechanism that feeds a bit into the workpiece at a controlled rate. Such tools are common in the aviation industry, and other industries in which precise drilling is needed in metallic workpieces or other hard workpieces.

Drilling holes, and particularly drilling deep holes within workpieces that are hard, using conventional methods can typically produce long drilled chips that are difficult to evacuate from the hole. These long chips are generated because the bit is fed into the workpiece at a constant feed rate (e.g., 0.003 inches per revolution). The constant feed rate means that the chips will have a constant thickness (i.e., 0.003 inches) that leads to a spiral shaped chip forming and growing as the drilling operation proceeds. The chips may end up being multiple hole diameters long, and can cause chip packing. The chips can therefore cause additional torque to be required, and can lead to longer cycle times and poor hole quality.

To address this issue, variation or oscillation of the feed rate may be introduced. By varying the feed rate (e.g., changing the feed rate by 0.001 to 0.005 inches per revolution), the resulting chips will have a variable thickness that alternates between thin and thick sections. This variable thickness will cause the chips to tend to break at the thin sections, and enable the remainder of the chip to be evacuated more easily. This method may be referred to as micro-peck drilling because the cutter (e.g., the bit) stays in the material and is always cutting a chip. If the amplitude is increased to exceed the feed rate, then macro-peck drilling results in which the cutter is actually removed from contact with the material of the workpiece.

Micro-peck drilling methods that are currently employed typically use special thrust bearings that have oscillating cam profiles. However, these special thrust bearings are typically very expensive and have limited life spans.

BRIEF SUMMARY OF SOME EXAMPLES

Some example embodiments may enable the provision of a positive feed tool that employs a different structure to employ micro-peck drilling with an oscillating feed rate. In this regard, some example embodiments may provide a feed rate oscillator that employs rolling elements in a thrust bearing to create the feed rate oscillation.

In an example embodiment, a positive feed tool is provided. The tool may include a motor, a power supply operably coupled to the motor to power the motor, a gear head and a spindle. The gear head may be operably coupled to the motor to be operated responsive to powering of the motor. The gear head may include a drive assembly and a feed assembly. The spindle may be operably coupled to the gear head to enable the spindle to be selectively driven rotationally and fed axially based on operation of the drive assembly and the feed assembly, respectively. The feed assembly may include a feed rate oscillator having a fixed cam and a movable cam operably coupled to each other via a plurality of rolling elements to oscillate between a maximum width and a minimum width of the feed rate oscillator based on a position of the movable cam. The rolling elements alternate between a first state in which at least some of the rolling elements are unloaded and a second state in which all of the rolling elements are loaded.

In another example embodiment, a gear head for selectively driving and feeding a spindle of a positive feed tool is provided. The gear head may include a drive assembly configured to selectively drive the spindle rotationally, and a feed assembly configured to selectively feed the spindle axially. The feed assembly may include a feed rate oscillator having a fixed cam and a movable cam operably coupled to each other via a plurality of rolling elements to oscillate between a maximum width and a minimum width of the feed rate oscillator based on a position of the movable cam. The rolling elements alternate between a first state in which at least some of the rolling elements are unloaded and a second state in which all of the rolling elements are loaded.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
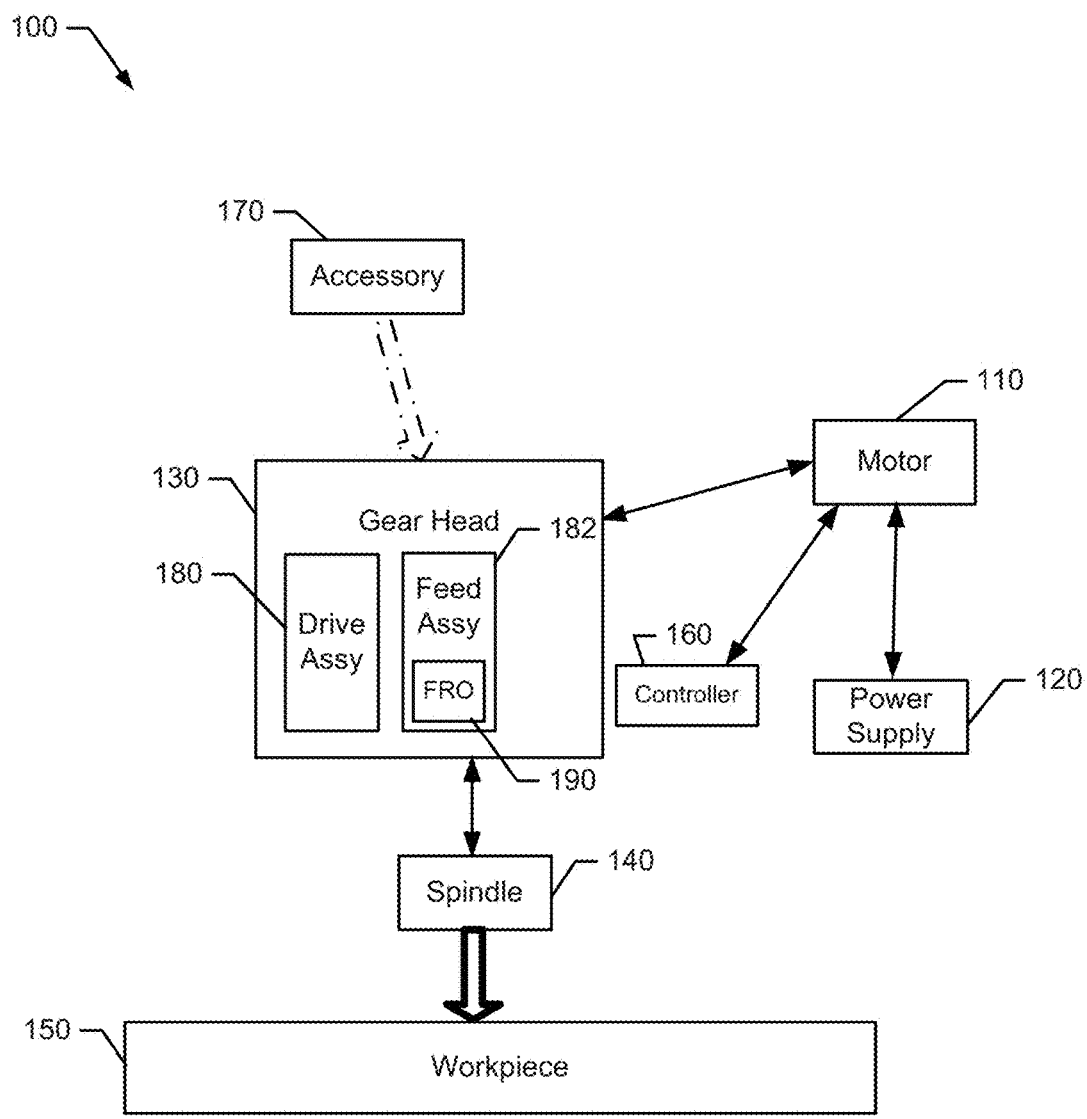
FIG. 1 illustrates a functional block diagram of a positive feed tool that may employ a feed rate oscillator according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of highly capable positive feed tools that also have superior characteristics relative to providing feed rate oscillation. In particular, some example embodiments may provide a positive feed tool having a feed rate oscillator that provides feed rate oscillation so that chip formation can be controlled based on the geometry and structure of the feed rate oscillator provided. Moreover, some example embodiments may provide a feed rate oscillator that employs rolling elements that alternate between being loaded and unloaded in order to extend the life of the rolling elements. FIG. 1 illustrates a functional block diagram of a positive feed tool that may employ a feed rate oscillator according to an example embodiment.

As shown in FIG. 1, a positive feed tool 100 of an example embodiment may include a motor 110, a power supply 120 and a gear head 130 that is configured to drive a spindle 140. The spindle 140 may be driven to rotate about an axis and also be fed in a direction along the axis of rotation to, for example, power a bit disposed at a distal end of the spindle 140 to drill a hole in a workpiece 150. In some cases, the motor 110 or other components of the positive feed tool 100 may be operated under the control of a controller 160. Although not required, the gear head 130 may be fitted or mated with one or more accessories 170 that may augment or otherwise alter various capabilities or aspects of performance of the positive feed tool 100. The accessories 170 may therefore be removable, exchangeable, or otherwise electively employed for operation of the positive feed tool 100.

In some examples, the motor 110 may be a pneumatic motor, and the power supply 120 may therefore be pressurized air. However, in alternative embodiments, the motor 110 may be an electric motor or a hydraulically powered motor, and the power supply 120 would then be battery/mains power or a hydraulic power supply, respectively. Regardless of how the motor 110 is powered, the motor 110 may be operably coupled to the gear head 130 to drive and feed the spindle 140.

In an example embodiment, the motor 110 may be operably coupled to drive the gear head 130 for rotation of the spindle 140 about an axis thereof via a drive assembly 180. In some cases, the spindle 140 may be an elongated member having one or more slots for engagement with a drive gear of the drive assembly 180 to rotate the spindle 140 based on rotation of the drive gear. The spindle 140 may also include threads for engagement with a feed gear of a feed assembly 182 that is configured to feed the spindle 140 in a direction along the axis of the spindle 140 and into (or away from) the workpiece 150. Thus, for example, the drive assembly 180 and the feed assembly 182 may be operably coupled to the motor 110 (and/or each other) to enable selective drive and feeding of the spindle 140.

As mentioned above, if the feed assembly 182 is powered to generate a constant feed rate (e.g., 0.003 inches per revolution), then the spiral shaped chips having a constant thickness will be generated, and various problems could result. Accordingly, to vary the thickness of the chips, and to facilitate breakage and more easy evacuation of the chips, an oscillating feed rate may be employed. To provide the oscillating feed rate, example embodiments may employ a feed rate oscillator 190 (or FRO), which may be operably coupled to or provided as a portion of the feed assembly 182.

As may be appreciated from the description above, the specific components of the gear head 130 can be varied in some cases. An example structure for the gear head 130 will be described in reference to FIG. 2. However, other specific structures can be employed to embody portions of the gear head 130 in some alternative embodiments. The structure employed for certain portions of the gear head 130 may then impact corresponding structures employed for the feed rate oscillator 190.

Figure 2:
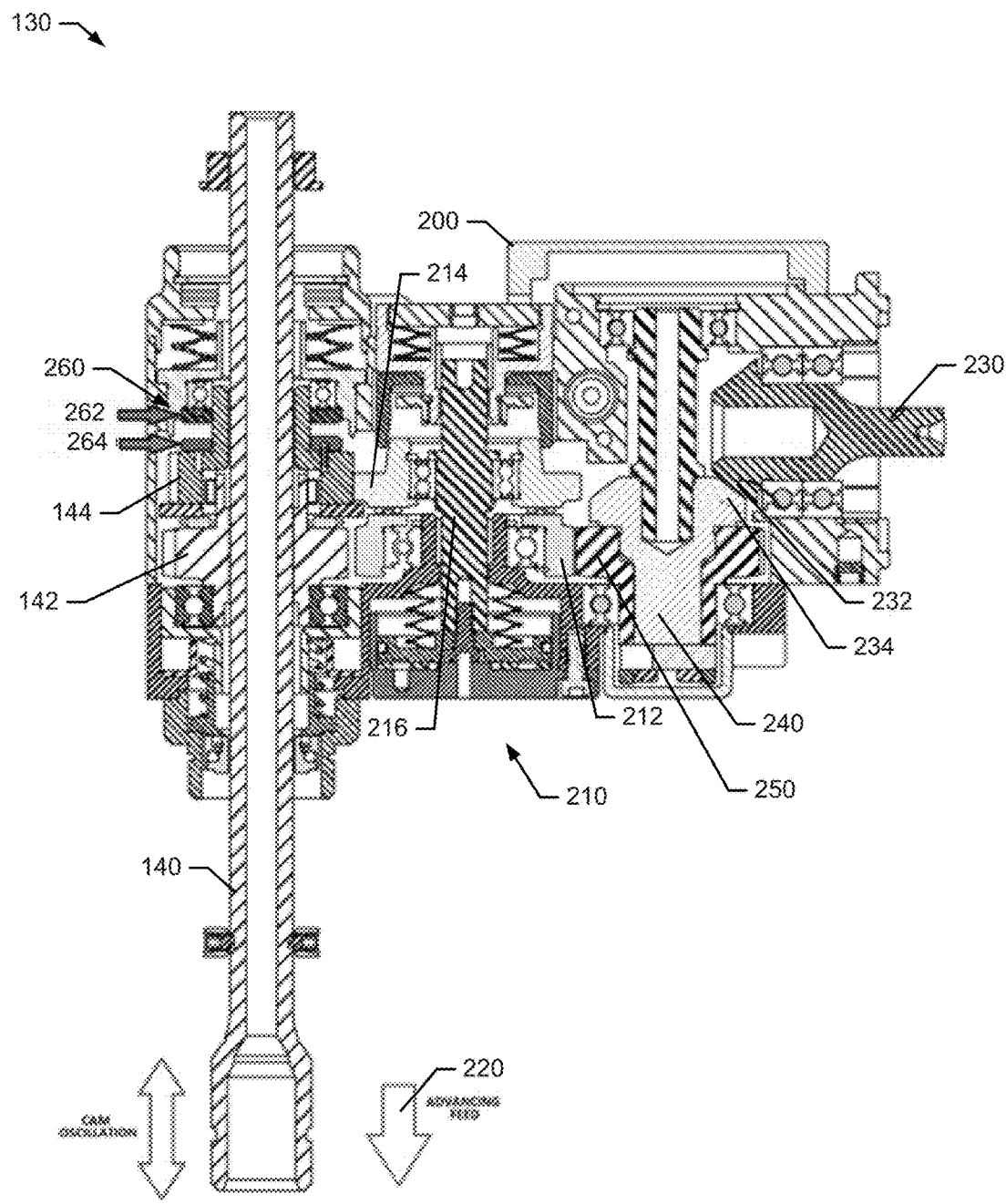
FIG. 2 illustrates a cross section view of a positive feed tool having a feed rate oscillator according to an example embodiment.

Referring now to FIG. 2, the gear head 130 may include a casing or housing 200 inside which various components of the drive assembly 180 and the feed assembly 182 may be housed. The motor 110 may be operably coupled to the spindle 140 via a differential unit 210. The differential unit 210 may include a differential drive gear 212 and a differential feed gear 214 that may engage a spindle drive gear 142 and spindle feed gear 144, respectively. The spindle drive gear 142 and spindle feed gear 144 may each be operably coupled to the spindle 140 to selectively provide drive and feed for the spindle 140. Meanwhile, the differential drive gear 212 and the differential feed gear 214 may each be operably coupled to a feed shaft 216.

In an example embodiment, the spindle 140 may include one or more slots for engagement with the spindle drive gear 142 and threads for engagement with the spindle feed gear 144. The spindle drive gear 142 and spindle feed gear 144 may each also have a generally annular shape with a central opening to receive the spindle 140. Internal threads provided on the spindle feed gear 144 may engage external threads along the length of the spindle 140 so that when the spindle feed gear 144 is rotated in relation to the spindle 140, the spindle 140 will feed in an advancing feed direction shown by arrow 220.

The differential drive gear 212 and the differential feed gear 214 each extend around the feed shaft 216 and include gear teeth for engagement with respective ones of the spindle drive gear 142 and spindle feed gear 144. The differential feed gear 214 is operably coupled to the feed shaft 216 to move axially with the feed shaft 216. The differential drive gear 212 is operably coupled to the feed shaft 216, but does not move axially with the feed shaft 216, instead having a central opening through which the feed shaft 216 slides.

When the motor 110 operates, an input shaft 230 is turned. A set of bevel gears 232/234 then translates the rotation of the input shaft 230 to input gear 240. Another gear 250 is operably coupled to the input gear 240. The input gear 240 is operably coupled to the differential unit 210 (e.g., via the differential drive gear 212. The differential drive gear 212 and the differential feed gear 214 may be selectively operably coupled to each other to cause the differential feed gear 214 to either rotate with the differential drive gear 212 (e.g., when the differential drive gear 212 and the differential feed gear 214 are engaged) or not rotate with the differential drive gear 212 (e.g., when the differential drive gear 212 and the differential feed gear 214 are not engaged). The spindle drive gear 142 will generally be driven by the differential drive gear 212 when the motor 110 operates and rotate the spindle 140. However, the spindle feed gear 144 is only driven when the differential feed gear 214 is engaged with the differential drive gear 212. When the differential feed gear 214 is disengaged from the differential drive gear 212, both the differential feed gear 214 and the spindle feed gear 144 become stationary. The rotation of the spindle 140 while the spindle feed gear 144 is stationary then resultantly causes the spindle 140 to be withdrawn and move in a direction opposite the advancing feed direction shown by arrow 220.

In a typical configuration, the feed rate generated by the operation described above would be a constant feed rate (e.g., of about 0.003 inches per revolution). Similarly, in some typical configurations, the load created by the resistance to feeding of the spindle 140 into the workpiece 160 may generally be borne by a thrust bearing 260 provided, for example, between some portion or component operably coupled to the housing 200 and the spindle feed gear 144. Thus, for example, one way to convert to a micro-peck drilling method may be accomplished by changing the shape and function of the thrust bearing 260 so that an oscillating feed rate is achieved. Employing such a method for achieving micro-peck drilling results in a fixed amount of oscillation based on the structure of the thrust bearing 260.

To enable feed rate oscillation to be achievable, some example embodiments may employ a dual cam structure, where the cams are shaped to accommodate rolling elements such that the rolling elements shift between loaded and unloaded states while the feed rate oscillation is provided. FIG. 2 shows a first cam 262 and a second cam 264, which form portions of the thrust bearing 260. The first cam 262 may be fixed within the housing 200, but the second cam 264 may be allowed to rotate with the spindle feed gear 144. Thus, as the spindle 140 is being fed, there is relative motion between the first cam 262 (which is stationary) and the second cam 264 (which moves at the same rate as the spindle feed gear 144). Rolling elements 266 are provided between the first and second cams 262 and 264 to provide for the relative motion between the first and second cams 262 and 264. Thus, the thrust bearing 260 is essentially an oscillating thrust bearing based on the design of the dual cam structure, which will be described in greater detail below in reference to FIGS. 3A, 3B, 3C and 3D.

In reference to FIGS. 3A, 3B, 3C and 3D, it can be appreciated that the rolling elements 266 may be provided in between the first and second cams 262 and 264 to provide the operable coupling between the first and second cams 262 and 264. The first and second cams 262 and 264 may each have a general annular shape with one flat surface and one grooved surface. The flat surfaces of the first and second cams 262 and 264 may face away from each other so that the grooved surfaces face toward each other. The rolling elements 266 may be rigid balls, cylinders or other such shapes capable of rolling between opposing surfaces. The rolling elements 266 may be made of any suitable material (e.g., metallic, ceramic, composite materials and/or the like) and may each have the same diameter and general shape. In some cases, the rolling elements 266 may abut each other to completely fill the space defined between the grooved surfaces. However, in other cases, spacer elements may be provided between adjacent rolling elements 266.

The grooved surface of the first cam 262 may be defined by a first annular groove 270 that includes a first undulating surface 272 having peaks and valleys at which the depth of the first annular groove 270 is minimum and maximum, respectively. The grooved surface of the second cam 264 may be defined by a second annular groove 274 that includes a second undulating surface 276 having peaks and valleys at which the depth of the second annular groove 274 is minimum and maximum, respectively. The rolling elements 266 may be inserted into the space formed by the first and second annular grooves 270 and 274.

Figure 3A:
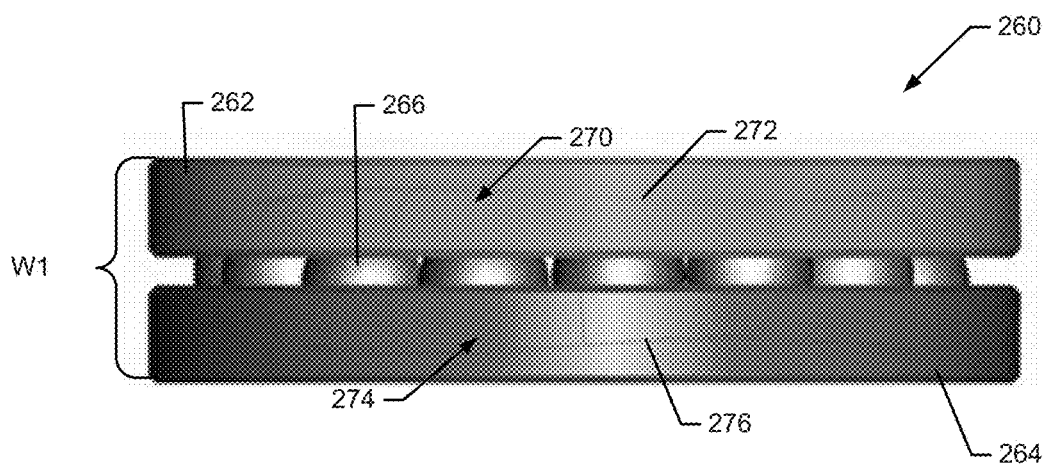
FIG. 3A illustrates the side view of the feed rate oscillator having a maximum axial width in accordance with an example embodiment.
Figure 3B:
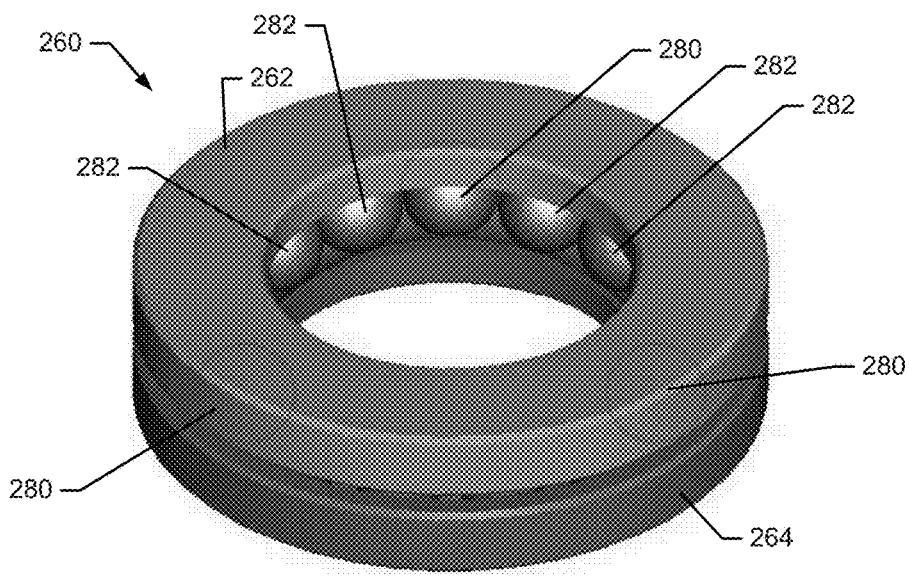
FIG. 3B illustrates loaded and unloaded rolling elements of the feed rate oscillator having the maximum axial width in accordance with an example embodiment.

Given that the first cam 262 is fixed and that the second cam 264 rotates, the alignments of the peaks and valleys in the first and second annular grooves 270 and 274 will continue to change as the second cam 264 rotates (e.g., with the spindle feed gear 144). When peaks of the first undulating surface 272 align with peaks of the second undulating surface 276 as shown in FIGS. 3A and 3B, only the rolling element (or rolling elements) immediately proximate to the respective peaks of the first and second undulating surfaces 272 and 276 will be loaded and therefore be loaded rolling elements 280. Remaining ones of the rolling elements 266 will only contact one of the first cam 262 or second cam 264 (dependent on gravity) since the alignment of the valleys of the first and second undulating surfaces 272 and 276 creates a space that is larger than a diameter of the rolling elements 266. These rolling elements 266 that only contact one of the first undulating surface 272 or the second undulating surface 276 may be referred to as unloaded rolling elements 282.

As shown in FIG. 3A, the distance between the flat faces may define a maximum width (W1) of the thrust bearing 260. The maximum width (W1) may be experienced when the peaks are aligned and the peak to peak distance between first undulating surface 272 and the second undulating surface 276 is about equal to the diameter of the rolling elements 266. Meanwhile, the distance between the valleys (which are also aligned) is larger than the diameter of the rolling elements 266.

The number of loaded rolling elements 280 will depend upon the number of peaks and valleys defined around the first and second annular grooves 270 and 274. In this example, three peaks and valleys are defined, so there will be three loaded rolling elements 280 when the peaks are aligned, as shown in FIG. 3B. If more peaks and valleys are defined, then more loaded rolling elements 280 would result when at least some unloaded rolling elements 282 are provided. The number of unloaded rolling elements 282 will depend upon the overall size of the thrust bearing 260 and the number of rolling elements 266 that are employed between the first and second cams 262 and 264. Of note, the number of peaks and valleys determines the frequency of feed rate oscillation. In this example, three cycles of feed rate oscillation will occur for every cycle of rotation of the spindle 140.

Figure 3C:
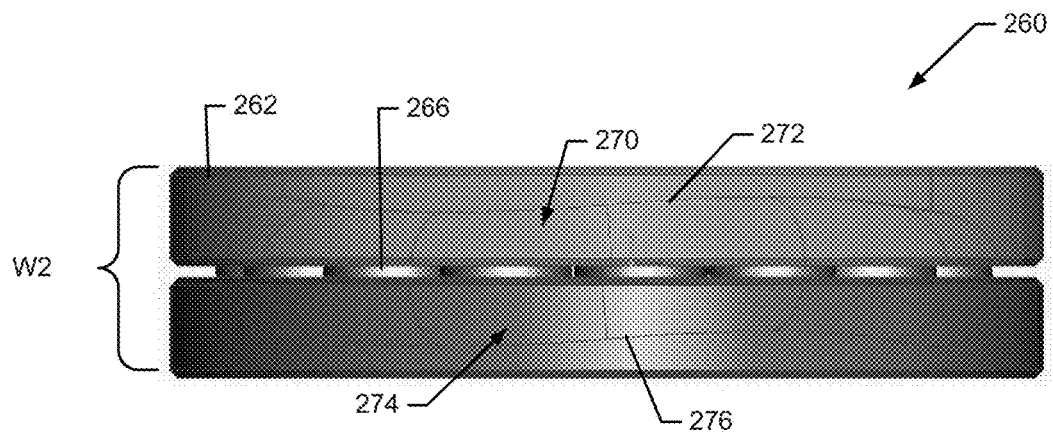
FIG. 3C illustrates the side view of the feed rate oscillator having a minimum axial width in accordance with an example embodiment.
Figure 3D:
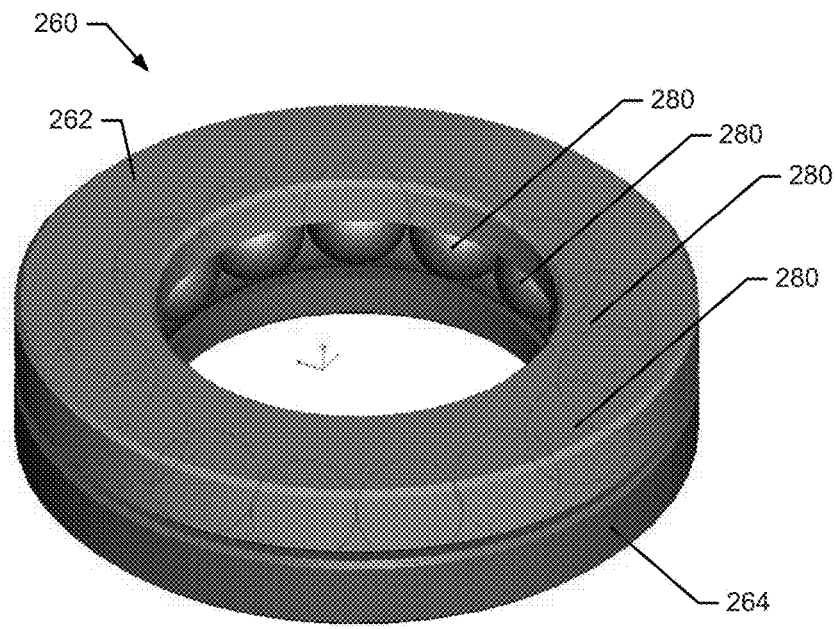
FIG. 3D illustrates loaded rolling elements of the feed rate oscillator having the minimum axial width in accordance with an example embodiment.

Referring now to FIG. 3C, when the peaks of the first cam 262 align with the valleys of the second cam 264 (and vice versa), the first undulating surface 272 and the second undulating surface 276 may be substantially equidistant from each other at all points along their respective lengths, and such distance may be substantially equal to the diameter of the rolling elements 266. The distance between the flat faces may define a minimum width (W2) of the thrust bearing 260. The minimum width (W2) may be experienced at a moment when all of the rolling elements 266 are bearing substantially equal load, and thus all of the rolling elements 266 are loaded rolling elements 280 as shown in FIG. 3D. Thus, the thrust bearing 260 has one movable and one fixed cam, and rotation of the movable cam causes the thrust bearing 260 to cycle between maximum and minimum widths (to correspondingly change chip size by the difference between maximum width (W1) and minimum width (W2)). When the thrust bearing 260 cycles between the maximum and minimum widths, the load state of the rolling elements also changes between a state in which all of the rolling elements are loaded, and a state in which at least some of the rolling elements are unloaded. In this example, the number of loaded elements is equivalent to the number of cycles of feed rate oscillation per revolution of the spindle 140, and all rolling elements are loaded at the minimum width, and the least or minimum number of rolling elements are loaded when the thrust bearing 260 is at its maximum width.

In practice, the second cam 264 (i.e., the movable cam) rotates with the spindle feed gear 144 to change the axial width of the thrust bearing 260 as the rolling elements 266 cycle between loaded and unloaded states. The axial width cycles between maximum width (W1), when only a selected number of rolling elements are loaded (i.e., an equal number to the number of peaks), and minimum width (W2), when all rolling elements 266 are loaded. As the axial width of the thrust bearing 260 changes, the chip thickness is varied accordingly, and the chips can be more easily broken and evacuated to improve the drilling operation so that speeds may be increased and/or the life of components may be extended. In particular, since the rolling elements 266 spend at least some time not under load, the life of the rolling elements 266 may also be extended.

Figure 4:
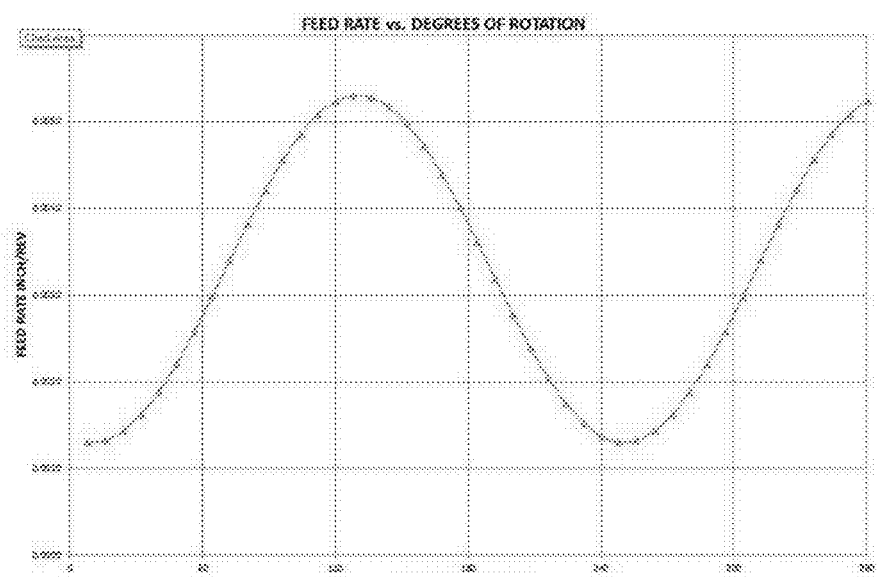
FIG. 4 illustrates a change in feed rate versus degrees of rotation in accordance with an example embodiment.

In an example where the feed rate is about 0.003 inches per revolution, a change in width of the thrust bearing of 0.004 inches would result in a change of feed rate between 0.001 inches to 0.005 inches per revolution. FIG. 4 illustrates an example plot of feed rate versus degrees of rotation where the maximum feed rate is about 0.0063 inches per revolution and the minimum feed rate is about 0.0003 inches per revolution (e.g., 0.0033+/−0.003), with a structure set up for three full cycles per revolution of the spindle 140. As mentioned above, the number of cycles per spindle revolution can be changed by correspondingly changing the number of peaks and valleys in the grooved surfaces of the first and second cams 262 and 264.

The number of sets of peaks and valleys may be referred to as the number of cam lobes. Thus, the number of cam lobes can be changed to vary the frequency of the oscillation. The frequency of a two-lobed set therefore results in a frequency of one oscillation per revolution of the spindle feed gear 144. A three-lobed set results in a frequency of one and one half oscillations per revolution, a four-lobed set results in a frequency of two, etc. Likewise, the chips break according to the frequency of the cams. An oscillation of one per revolution will result in a chip that is one diameter long. Two oscillations per revolution creates chips one-half a diameter long, three oscillations one-third of a diameter long, etc. In these examples, the frequency changes to attain the desired chip length; however, the feed rate and the amplitude remain constant.

Once the chip length is determined by frequency selection, the amplitude and feed rate must be determined. Feed rate is determined based on material and desired rate. The amplitude of the cams is selected based on the feed rate. Other factors also determine the effectiveness of the cam amplitude such as spindle, nose, cutter, tool, and material stiffness.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A positive feed tool comprising:
   a motor;
   a power supply operably coupled to the motor to power the motor;
   a gear head operably coupled to the motor to be operated responsive to powering of the motor, the gear head comprising a drive assembly and a feed assembly; and
   a spindle operably coupled to the gear head to enable the spindle to be selectively driven rotationally and fed axially based on operation of the drive assembly and the feed assembly, respectively,
   wherein the feed assembly comprises a feed rate oscillator comprising a fixed cam and a movable cam operably coupled to each other via a plurality of rolling elements to oscillate between a maximum width and a minimum width of the feed rate oscillator based on a position of the movable cam, the rolling elements alternating between a first state in which at least some of the rolling elements are unloaded and a second state in which all of the rolling elements are loaded.

2. The positive feed tool of claim 1, wherein the rolling elements are in the first state at the maximum width of the feed rate oscillator and are in the second state at the minimum width of the feed rate oscillator.

3. The positive feed tool of claim 1, wherein the fixed cam defines a first annular groove extending around a grooved face of the fixed cam, and the movable cam defines a second annular groove around a grooved face of the movable cam, the first and second annular grooves facing each other to contain the rolling elements.

4. The positive feed tool of claim 3, wherein a first undulating surface defining peaks and valleys forms the first annular groove and a second undulating surface defining peaks and valleys forms the second annular groove.

5. The positive feed tool of claim 4, wherein the rolling elements are in the first state when peaks of the first undulating surface are aligned with peaks of the second undulating surface.

6. The positive feed tool of claim 4, wherein the rolling elements are in the second state when peaks of the first undulating surface are aligned with valleys of the second undulating surface.

7. The positive feed tool of claim 1, wherein the rolling elements abut each other to substantially fill the first and second annular grooves.

8. The positive feed tool of claim 1, wherein the rolling elements are spaced apart from each other within the first and second annular grooves.

9. The positive feed tool of claim 1, wherein a number or lobes of the fixed and movable cams determines a frequency of oscillation of the feed rate oscillator.

10. The positive feed tool of claim 1, wherein the fixed cam is fixed within a housing of the gear head, and the movable cam moves with a spindle feed gear operably coupled to the spindle.

11. The gear head of claim 1, wherein the fixed cam is fixed within a housing of the gear head, and the movable cam moves with a spindle feed gear operably coupled to the spindle.

12. A gear head for selectively driving and feeding a spindle of a positive feed tool, the gear head comprising:
a drive assembly configured to selectively drive the spindle rotationally; and
a feed assembly configured to selectively feed the spindle axially,
wherein the feed assembly comprises a feed rate oscillator comprising a fixed cam and a movable cam operably coupled to each other via a plurality of rolling elements to oscillate between a maximum width and a minimum width of the feed rate oscillator based on a position of the movable cam, the rolling elements alternating between a first state in which at least some of the rolling elements are unloaded and a second state in which all of the rolling elements are loaded.

13. The gear head of claim 12, wherein the rolling elements are in the first state at the maximum width of the feed rate oscillator and are in the second state at the minimum width of the feed rate oscillator.

14. The gear head of claim 12, wherein the fixed cam defines a first annular groove extending around a grooved face of the fixed cam, and the movable cam defines a second annular groove around a grooved face of the movable cam, the first and second annular grooves facing each other to contain the rolling elements.

15. The gear head of claim 14, wherein a first undulating surface defining peaks and valleys forms the first annular groove and a second undulating surface defining peaks and valleys forms the second annular groove.

16. The gear head of claim 15, wherein the rolling elements are in the first state when peaks of the first undulating surface are aligned with peaks of the second undulating surface.

17. The gear head of claim 15, wherein the rolling elements are in the second state when peaks of the first undulating surface are aligned with valleys of the second undulating surface.

18. The gear head of claim 12, wherein the rolling elements abut each other to substantially fill the first and second annular grooves.

19. The gear head of claim 12, wherein the rolling elements are spaced apart from each other within the first and second annular grooves.

20. The gear head of claim 12, wherein a number or lobes of the fixed and movable cams determines a frequency of oscillation of the feed rate oscillator.

* * * * *